United States Patent [19]
Suozzo

[11] 3,718,305
[45] Feb. 27, 1973

[54] CONSTANT SUPPORT DEVICE
[76] Inventor: Leonard S. Suozzo, 366 Maple Hill Drive, Hackensack, N.J.
[22] Filed: April 16, 1971
[21] Appl. No.: 134,728

[52] U.S. Cl..................................248/54 CS, 248/58
[51] Int. Cl....................................F16l 3/20
[58] Field of Search ...............248/54 CS, 54 R, 58

[56] References Cited

UNITED STATES PATENTS

| 3,167,285 | 1/1965 | Suozzo | 248/54 CS |
|---|---|---|---|
| 3,534,934 | 10/1970 | McCabe | 248/54 CS |
| 2,946,547 | 7/1960 | Grabe | 248/54 CS |
| 2,903,213 | 9/1959 | Suozzo | 248/54 CS |
| 2,939,663 | 6/1960 | Suozzo | 248/54 CS |
| 2,923,507 | 2/1960 | Suozzo | 248/54 CS |

Primary Examiner—J. Franklin Foss
Attorney—F. J. Pisarra

[57] ABSTRACT

A device for exerting a substantially constant supporting force to a vertically movable load, such as piping, the device comprising a support including a tubular housing having an end wall; a spring mechanism within the housing and including a movable backing plate, a spring bearing at opposite ends against the backing plate and housing end wall, and rod means connected at one end to the backing plate and extending through the spring and the housing end wall; and a lever pivotal relative to the support and pivotally connected to the other end of the rod means and to a load-carrying unit about spaced parallel axes. The device also includes means interposed between the backing plate and the housing for minimizing friction therebetween, adjustable means connected to the lever and the rod means for readily varying the length of the load arm of the device, and adjustable preset means for conveniently and simply converting the device into a rigid support when the piping is in its "cold load" position at the time the device is assembled and prior to installation and at such times as the piping is out of normal service and is subjected to a maintenance procedure, such as hydrostatic testing, following initial operation.

3 Claims, 10 Drawing Figures

INVENTOR.
LEONARD S. SUOZZO
BY F. J. Pisarra
Attorney

INVENTOR.
LEONARD S. SUOZZO
BY
F. J. Pisarra
Attorney

CONSTANT SUPPORT DEVICE

BACKGROUND OF THE INVENTION

This invention relates to the art of supports and, more particularly, to a spring device for supporting piping and/or other equipment which is subject to vertical movement in use. The invention pertains, in one of its more specific aspects, to an improved constant support device that is characterized by its simplicity of design, economy in manufacturing, installation, maintenance and adjustment costs, and ability to render long-term dependable service.

There have been a number of developments over the years in the field of apparatus for exerting a substantially constant supporting force to vertically movable equipment, such as piping, which is subject to changes in position due to changes in its thermal condition. One category of such apparatus comprehends constant support devices which are exemplified by the constructions disclosed in several United States patents including my U.S. Pat. No. 2,923,507, and C. G. Grabe U.S. Pat. No. 2,946,547. The constant support devices of these patents include a housing; a spring mechanism comprised of a compression spring and a backing plate movable in the housing and rod means connected to the backing plate and extending through the housing; and a lever pivotal relative to the housing and pivotally connected to the free end of the rod means and to a load-carrying unit which is adapted to be connected to the piping. In those devices, the spring loading is adjusted by varying the effective length of the rod means thereby correspondingly varying the distance between certain pivotal axes. Certain prior art devices utilize a multi-part rod means having, intermediate its ends, a pivotal connection which rides along a combined support and guide unit within the spring housing. This arrangement is quite expensive and develops undesirable friction in use.

There also have been several developments for adjustably presetting a constant support device to its "cold load" position at the time of assembly and prior to installation and at such times as the piping is out of active service and is being subjected to hydrostatic testing or other maintenance procedure following initial operation. One such development is that disclosed in C. P. Sherburne U.S. Pat. No. 2,975,995. Prior art adjustable preset means for constant support devices have not been entirely satisfactory and are objectionable for several reasons. They are, for one thing, complex in design and expensive in manufacturing, installation and subsequent adjustment costs. Moreover, prior art preset means do not permit accurate adjustment.

As will be evident to persons trained in the art from the ensuing detailed description and the accompanying drawings, a constant support device embodying this invention is simpler and more economical in manufacturing, installation, maintenance and adjustment costs than related prior art devices; is devoid of the objections to known similar devices; and affords a number of worthwhile benefits and advantages over the prior art.

SUMMARY OF THE INVENTION

The constant support device of this invention is comprised of a support including a tubular housing having a first backing plate and adapted to be secured to an overhead supporting structure; provided spring mechanism including a second backing plate slidable in the housing, a compression spring within the housing and bearing at its opposite ends against the backing plates, and rod means connected at one end to the second backing plate and extending through the spring and the first backing plate; and a lever pivotally connected to the support about a first axis and pivotally connected to the other end of the rod means about a second axis and to a load-carrying unit about a third axis. The first, second and third axes are spaced apart and parallel. The device is provided with means interposed between the second backing plate and the housing for minimizing friction therebetween. It is also provided with adjustable means connected to the lever and the rod means for varying the length of the load arm of the device. The device is additionally provided with improved adjustable preset means for readily and simply converting the device into a rigid support, as required, depending on conditions of use.

The preset means includes a removable pin which is adapted to immobilize the device and render it rigid with its parts in the calculated "cold load" position at the time the device is assembled and prior to installation. This facilitates installation and eliminates the possibility of subjecting the device to undesirable overloading or underloading at the time of installation. Upon completion of installation, the pin is removed, thereby allowing the device to function as a constant support.

It is common practice, after a piping system has been in normal service for a period of time, to shut down the system for maintenance purposes, such as for hydrostatic testing. As a consequence of such previous service, the parts of the device do not usually return to their original cold load position. One reason for this is that the usual hot working adjustment has re-orientated the operating range of the device within its total range. If, during a maintenance period, the device is immobilized for testing in its new cold load position, then upon again placing the system in operation, the device will operate to its correct hot position. The preset means of this invention permits the device to be readily and conveniently adjusted in rigid condition in its new cold load position.

The primary object of this invention is to provide a constant support device for piping and the like which is simpler in design and more economical in construction than known similar devices.

Another object of the invention is to minimize friction between certain relatively movable parts of a constant support device whereby the device exerts a more nearly perfect supporting force than is achievable with presently known devices of the same general type.

Another object of the invention is to provide a spring type constant support device with improved adjusting means.

A further object of the invention is to provide improved preset means in a constant support device.

A still further object of the invention is the provision of a device of the character indicated that is simple and compact in design; that is reasonable in manufacturing, installation and maintenance costs; that is adapted to be easily and quickly adjusted, as required; and that affords long-term, efficient and dependable service in use.

The above-stated objects and additional objects, as well as the advantages of the invention, will be manifest to persons trained in the art from the following detailed description and the annexed drawings which describe and illustrate related prior art and several embodiments of the invention.

BRIEF DESCRIPTION OF THE DRAWINGS

In the drawings, wherein like reference characters identify like parts in the several views.

DESCRIPTION OF THE PRIOR ART

Figure 1:
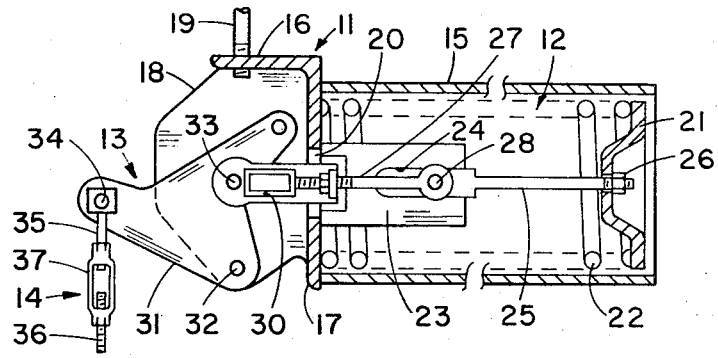
FIG. 1 is a central, vertical, longitudinal cross sectional view of a prior art constant support device.

Prior art, to the extent depicted in FIG. 1, concerns a constant support device which is substantially the same as that disclosed in my said U.S. Pat. No. 2,923,507 and which comprises a support 11, a spring mechanism 12, a lever 13 and a load-carrying unit 14.

Support 11 includes a tubular housing 15, an L-shaped member consisting of a horizontal part 16 and a vertical part 17, and a pair of spaced, parallel, side members 18 (only one shown) which are welded to the L-shaped member. Part 16 is provided with a threaded rod 19 for attachment to an overhead supporting structure. Part 17 is formed with a through opening 20 and is welded to one end of housing 15. This part serves as a fixed backing plate.

Spring mechanism 12 comprises a dished backing plate 21 that is slidable in housing 15, a helical compression spring 22 within the housing and bearing against plates 17 and 21, a tubular guide 23, which is welded to plate 17 and projects into the housing and which has a pair of parallel, longitudinal slots 24 (only one shown), and rod means including a threaded first rod 25 which is connected to plate 21 by a nut 26, a threaded second rod 27 which is connected and pivotal relative to rod 25 by pivot device 28 that is slidable along the path defined by slots 24. The rod means also includes a means 30 for its effective length.

Lever 13 consists of a pair of spaced parallel plates 31 (only one shown) which are connected to support plates 18 for pivotal movement about an axis 32, to the outer end of rod 27 for pivotal movement about an axis 33 and to the upper end of load-carrying unit 14 for pivotal movement about an axis 34.

Load-carrying unit 14 comprises coaxial upper and lower rods 35 and 36, respectively, which are coupled by a turnbuckle 37.

DESCRIPTION OF THE PREFERRED EMBODIMENTS

Reference is now had to FIGS. 3 and 5 through 8 for an understanding of the construction of the therein illustrated constant support device of this invention. A number of parts of this device are the same as those of the prior art device of FIG. 1 and are denoted by corresponding reference numerals. The device under consideration includes a spring mechanism 40 which differs over that of the prior art device principally in that its rod means includes a single threaded rod 41 which is connected at one end to backing plate 21 by a nut 42 and is pivotally connected at its other end, as will be described. Also, backing plate 21 is equipped with anti-friction means, such as a ball or roller bearing 43, to minimize friction between this plate and housing 15.

Figure 3:
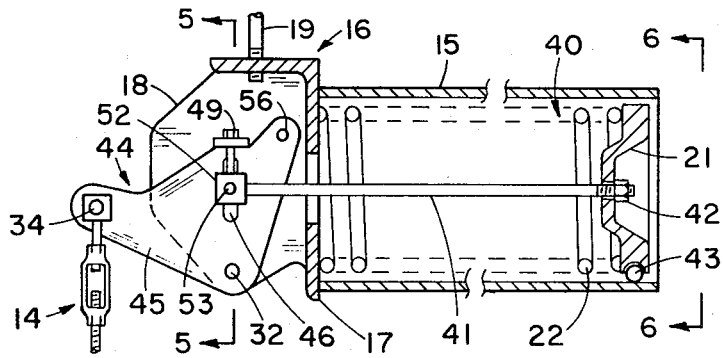
FIG. 3 corresponds to FIG. 1 and illustrates one form of constant support device of this invention.
Figure 5:
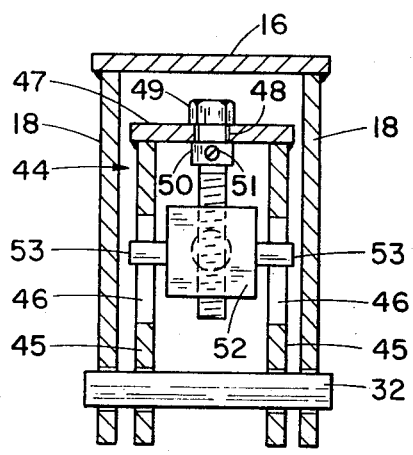
FIG. 5 is an enlarged view taken along line 5—5 of FIG. 3.
Figure 6:
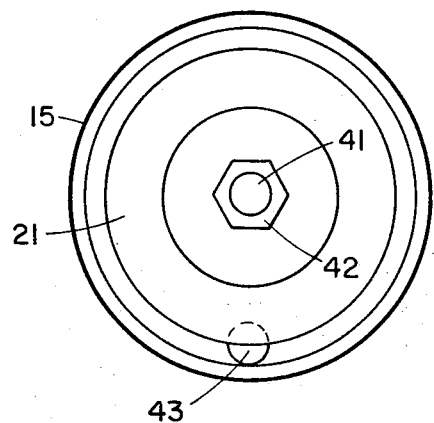
FIG. 6 is an enlarged view taken along line 6—6 of FIG. 3.
Figure 7:
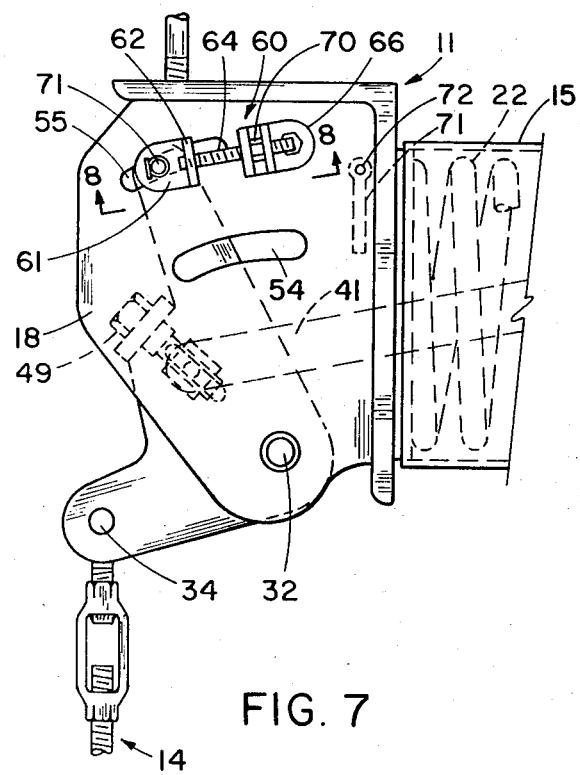
FIG. 7 is an enlarged view in side elevation of the left end portion of the device of FIG. 3.
Figure 8:
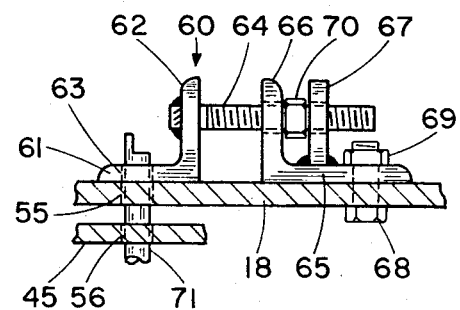
FIG. 8 is a view in enlargement taken along line 8—8 of FIG. 7.

The device shown in FIG 3 and other views also includes a lever 44 which, as best shown in FIG. 5, is partly disposed between support plates 18. Lever 44 consists of a pair of spaced parallel plates 45 having aligned vertical slots 46 and a top plate 47 which is welded to plates 45. The top plate has a through opening 48 to receive a bolt 49. The bolt is provided with a collar 50 and a set screw 51 beneath plate 47 to permit rotation but prevent axial movement of the bolt relative to the plate. Bolt 49 engages a tapped block 52 which is positioned between plates 45 and is equipped with coaxial pin extensions 53 that register with slots 46. At least one of the support plates 18 has a first arcuate slot 54 (FIG. 7) to permit access to the head of bolt 49 and adjustment of block 52 when the lever is swung in a clockwise direction about axis 32 (FIG. 7) so that the bolt head may be gripped by a turning tool through this slot. This plate has a second arcuate slot 55 which is aligned with openings 56 in lever plates 45 (FIGS. 3 and 8).

Figure 2:
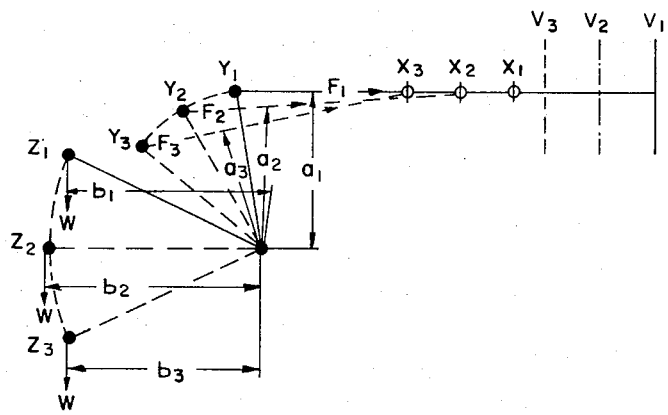
FIG. 2 is a basic force diagram showing the relative position of certain pivotal axes and other data during use of the prior art device of FIG. 1.
Figure 4:
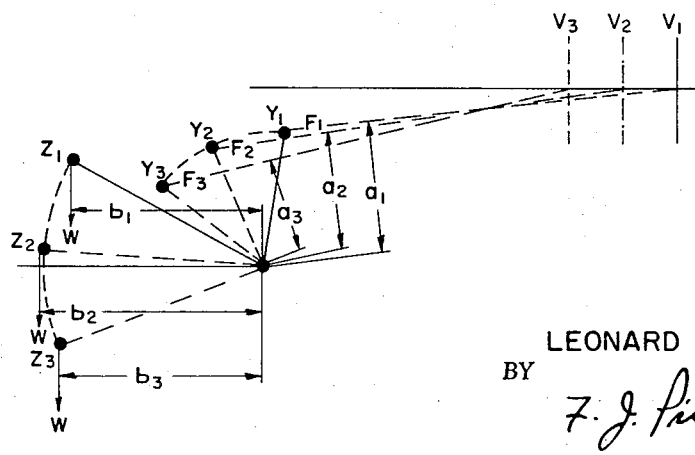
FIG. 4 corresponds to FIG. 1 and pertains to the device of FIG. 3.

The balancing effect obtained by both the prior art device (FIG. 1) and the inventive device (FIG. 3) will be evident upon consideration of the respective force diagrams of FIGS. 2 and 4. In FIG. 2, $V_1$, $V_2$ and $V_3$ denote successive positions of the connection between plate 21 and rod 25; $X_1$, $X_2$ and $X_3$ denote successive positions of the axis of pivot device 28; $Y_1$, $Y_2$ and $Y_3$ denote successive positions of axis 33; and $Z_1$, $Z_2$ and $Z_3$ denote successive positions of axis 34. $W$ represents the weight of the load supported by the device. Also $F_1$, $F_2$ and $F_3$ denote the spring forces developed by spring 22 at corresponding indicated successive positions of the various pivotal axes.

In like manner, the connections, axes, load weight and forces of the device of FIG. 3 are denoted in FIG. 4 by reference characters corresponding to those of FIG. 2.

Referring to each of FIGS. 2 and 4, it will be observed that the load and spring force moments are in balance when the parts of the devices are in various relative positions. Thus:

$$W \times b_1 = F_1 \times a_1$$

$$W \times b_2 = F_2 \times a_2$$

$$W \times b_3 = F_3 \times a_3$$

Accordingly, $W = (F_1 \times a_1)/b_1 = (F_2 \times a_2)/b_2 = (F_3 \times a_3)/b_3$ It will be noted that the inventive device (FIG. 3) eliminates pivot connection 28, tubular guide 23 and associated parts, thereby simplifying construction, substantially reducing material and manufacturing costs and minimizing friction losses in operation.

Instead of varying the effective length of the rod means in adjusting of the prior art device of FIG. 1 by means 30, the device of FIG. 3 utilizes an adjustable block 50 to vary the load arm of the device, i.e., the distance between axes 32 and 51. This affords an important advantage over the prior art. In the present invention, adjustment is achieved by keeping the spring at its initial design position and varying the length of the spring arm $a_1$ thereby obtaining a larger constant load range. This larger load range not only permits reduction in the number of unit sizes for commercial purposes, affording manufacturing economies, but also savings in labor costs in large field installations.

The device of this invention includes preset means 60 of the character stated earlier herein. The preset means is illustrated in detail in FIGS. 7 and 8 and comprises an L-shaped first bracket consisting of arms 61 and 62. Arm 61 has a through opening 63. Arm 62 has a tapped through opening for receiving an end of a threaded rod 64 that is welded thereto. The preset means also includes a second bracket consisting of an arm 65 and a pair of spaced, upstanding, parallel arms 66 and 67. This bracket is affixed to a support plate 18 by a bolt 68 and a nut 69, as shown. Arms 66 and 67 have openings through which threaded rod 64 extends freely. An adjusting nut 70 is interposed between bracket arms 66 and 67 and threadedly engages rod 64. This nut serves to vary the spacing between arms 61 and 66 of the indicated brackets, as required.

A preset pin 71 is adapted to be removably inserted through opening 63, slot 55 and openings 56 when the parts are in the relative position shown in FIG. 8. Thus it will be noted that the preset means effectively converts the device into a rigid support, when and as required. The adjustment feature of the preset means permits convenient and quick immobilization of the device at the time of assembly and prior to installation at the calculated cold load position of the piping. The preset means may be readily adjusted to immobilize the device at any new cold load position after the device has been in service and during maintenance procedures, such as hydrostatic testing. The preset pin, when not in use, may be stored for future use on a conveniently accessible holder, such as a brass screw 72, that is secured to support plate 18 (FIG. 7).

Figure 9:
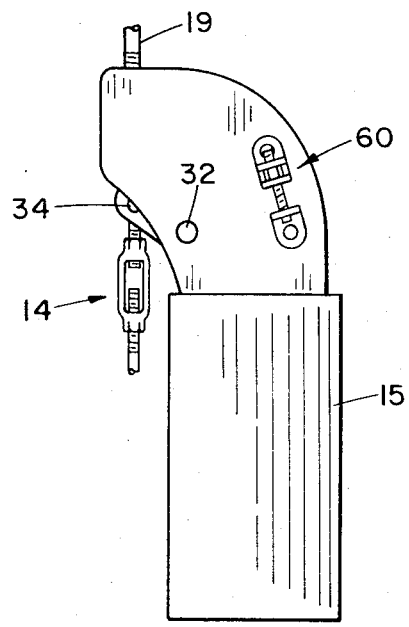
FIG. 9 is a side elevation view of a second form of constant support device of this invention.
Figure 10:
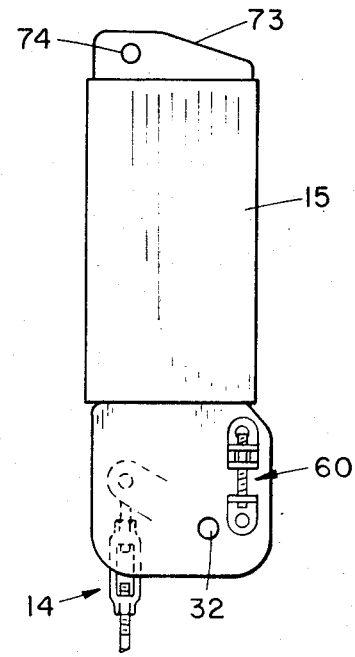
FIG. 10 is a side elevation view of a third form of constant support device of this invention.

FIGS. 9 and 10 illustrate embodiments of the invention in which the housing and related parts are turned 90° from the position shown in FIG. 3. In FIG. 9, the lever and the load-carrying unit are positioned above the support housing 15. In FIG. 10, the parts are reversed and the lever and load-carrying unit are positioned below the support housing. The upper end of housing 15 carries a bracket 73 having an opening 74 for reception of a suitable connector (not shown) for attachment to an overhead structure.

Based on the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. In a device for exerting a substantially constant supporting force to a vertically movable load, such as piping, and having a support including a tubular housing and a stationary backing plate at one end of the housing; a spring mechanism within the housing and including a movable backing plate slidable along the housing, spring means interposed between and bearing against the backing plates, and rod means connected at one end to the movable backing plate and extending through the spring means and the stationary backing plate; a lever connected to the support, to the other end of the rod means and to a load-carrying unit for pivotal movement about respective first, second and third axes; the improvement comprising:

a. anti-friction means engaging the movable backing plate and the housing for minimizing friction therebetween, said anti-friction means comprising
    1. a bearing, such as a ball or roller bearing, engaging the peripheral portion of the movable backing plate and the inner surface of the housing;
  b. adjustable means connected to the lever and to said other end of the rod means for varying the distance between said first and second axes.

2. In a device for exerting a substantially constant supporting force to a vertically movable load, such as piping, and having a support including a tubular housing and a stationary backing plate at one end of the housing; a spring mechanism within the housing and including a movable backing plate slidable along the housing, spring means interposed between and bearing against the backing plates, and rod means connected at one end to the movable backing plate and extending through the spring means and the stationary backing plate; a lever connected to the support, to the other end of the rod means and to a load-carrying unit for pivotal movement about respective first, second and third axes; the improvement comprising:

a. anti-friction means engaging the movable backing plate and the housing for minimizing friction therebetween;
  b. adjustable means connected to the lever and to said other end of the rod means for varying the distance between said first and second axes; and
  c. adjustable preset means carried by the support for immobilizing the device and including:
    1. a first bracket secured to the support;
    2. a second bracket having a through opening;
    3. a removable pin registering with the opening in the second bracket and with openings in the support and the lever;

4. a rod affixed to the second bracket and projecting through and slidable relative to the first bracket; and
5. means engaging the rod and associated with the first bracket for varying the effective distance between the brackets.

3. A device according to claim 2 wherein the rod is threaded and the last-mentioned means comprises a nut.

* * * * *